United States Patent
Yetukuri et al.

(10) Patent No.: US 9,434,276 B2
(45) Date of Patent: Sep. 6, 2016

(54) VEHICLE SEAT ADJUSTMENT ASSEMBLY

(71) Applicant: Lear Corporation, Southfield, MI (US)

(72) Inventors: Arjun Yetukuri, Rochester Hills, MI (US); David A. Hein, Sterling Heights, MI (US); Gerald S. Locke, Lake Orion, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 14/300,450

(22) Filed: Jun. 10, 2014

(65) Prior Publication Data

US 2014/0265477 A1 Sep. 18, 2014

Related U.S. Application Data

(63) Continuation of application No. 13/049,230, filed on Mar. 16, 2011, now Pat. No. 8,781,689.

(51) Int. Cl.
| | |
|---|---|
| *B60N 2/02* | (2006.01) |
| *B60N 2/16* | (2006.01) |
| *B60N 2/22* | (2006.01) |
| *B60N 2/48* | (2006.01) |
| *B60N 2/44* | (2006.01) |
| *B60N 2/10* | (2006.01) |
| *B60N 2/23* | (2006.01) |
| *G06F 3/044* | (2006.01) |

(52) U.S. Cl.
CPC ............ *B60N 2/0228* (2013.01); *B60N 2/442* (2013.01); *B60N 2/4805* (2013.01); *B60N 2/4808* (2013.01); *B60N 2/4838* (2013.01); *B60N 2/10* (2013.01); *B60N 2/16* (2013.01); *B60N 2/224* (2013.01); *B60N 2/232* (2013.01); *G06F 3/044* (2013.01)

(58) Field of Classification Search
None
See application file for complete search history.

(56) References Cited

U.S. PATENT DOCUMENTS

| | | | |
|---|---|---|---|
| 4,674,797 A | 6/1987 | Tateyama | |
| 4,935,680 A | 6/1990 | Sugiyama | |
| 5,105,132 A | 4/1992 | Sakamoto et al. | |

(Continued)

FOREIGN PATENT DOCUMENTS

| | | |
|---|---|---|
| DE | 10250416 A1 | 8/2003 |
| DE | 102008064348 B3 | 4/2010 |
| EP | 0352234 B1 | 4/1993 |

OTHER PUBLICATIONS

Chinese Office Action for corresponding Application No. 201210054778.1, mailed Dec. 30, 2013, 9 pages.

(Continued)

*Primary Examiner* — Jerrah Edwards
*Assistant Examiner* — Demetra Smith-Stewart
(74) *Attorney, Agent, or Firm* — Brooks Kushman P.C.

(57) ABSTRACT

A vehicle seat adjustment assembly has an actuator adapted to move a component of the vehicle seat assembly, and a generally planar sensor array in communication with the controller and accessible from an outer surface of the vehicle seat assembly. The sensor array has a plurality of adjacent sensors accessible from an outer surface of the vehicle seat assembly. A controller is in communication with the actuator for controlling the actuator and in communication with the sensor array. The controller is configured to control the actuator to move the component in response to receiving a signal indicative of a touch input of the sensor array by a user such that the movement of the component correlates with the input to the sensor array.

20 Claims, 3 Drawing Sheets

(56) References Cited

U.S. PATENT DOCUMENTS

| | | |
|---|---|---|
| 5,669,668 A | 9/1997 | Leuchtmann |
| 5,864,105 A * | 1/1999 | Andrews .............. B60N 2/0228 200/5 R |
| 5,952,630 A | 9/1999 | Filion et al. |
| 6,275,146 B1 * | 8/2001 | Kithil et al. .............. 340/425.5 |
| 6,483,048 B1 | 11/2002 | Bontrager et al. |
| 6,657,140 B2 | 12/2003 | Rantet |
| 6,765,158 B1 | 7/2004 | Morrison et al. |
| 6,983,995 B1 | 1/2006 | Veine et al. |
| 7,248,955 B2 | 7/2007 | Hein et al. |
| 7,267,407 B1 | 9/2007 | Demick et al. |
| 7,369,928 B2 | 5/2008 | Wang et al. |
| 7,390,982 B2 * | 6/2008 | Schmidt .............. B60N 2/0228 200/5 R |
| 7,455,363 B2 | 11/2008 | Chung |
| 7,631,932 B2 | 12/2009 | Hoffman |
| 7,656,299 B2 | 2/2010 | Gentry et al. |
| 7,860,626 B2 | 12/2010 | Breed |
| 8,433,482 B2 * | 4/2013 | Schaal et al. .................. 701/49 |
| 2003/0169033 A1 * | 9/2003 | Tromblee .............. B60N 2/002 324/207.2 |
| 2005/0134559 A1 | 6/2005 | Hein et al. |
| 2007/0235297 A1 | 10/2007 | Stoschek et al. |
| 2007/0257528 A1 | 11/2007 | Akaike et al. |
| 2009/0058162 A1 | 3/2009 | Boes et al. |
| 2009/0146479 A1 | 6/2009 | Boes et al. |
| 2009/0243354 A1 | 10/2009 | Farquhar et al. |
| 2009/0243364 A1 | 10/2009 | Brunner et al. |
| 2010/0045090 A1 | 2/2010 | Brunner et al. |
| 2010/0148559 A1 | 6/2010 | Prokop et al. |
| 2011/0316318 A1 | 12/2011 | Yamaguchi et al. |
| 2014/0210239 A1 | 7/2014 | Yetukuri et al. |

OTHER PUBLICATIONS

German Office Action for corresponding Application No. 10 2012 203 877.9, mailed Apr. 10, 2013, 4 pages.

U.S. Office Action for corresponding U.S. Appl. No. 14/229,105, mailed Oct. 22, 2015, 16 pages.

* cited by examiner

VEHICLE SEAT ADJUSTMENT ASSEMBLY

CROSS-REFERENCE TO RELATED APPLICATIONS

This application is a continuation of U.S. application Ser. No. 13/049,230 filed Mar. 16, 2011, now U.S. Pat. No. 8,781,689, the disclosure of which is incorporated in its entirety by reference herein.

TECHNICAL FIELD

Various embodiments relate to systems for controlling a vehicle seat assembly.

BACKGROUND

A vehicle seat assembly may be provided with a movable seat component. An example of the movable seat component is a movable head restraint. Examples of movable head restraints are disclosed in U.S. Pat. Nos. 4,674,797, 5,699,668, 6,983,995, and 7,267,407.

SUMMARY

According to an embodiment, a vehicle seat adjustment assembly is provided with at least one actuator adapted to move a component of the vehicle seat assembly along a path, and a generally planar sensor array accessible from an outer surface of the vehicle seat assembly. The sensor array has a plurality of adjoining sensors arranged in at least one column and at least two rows. The vehicle seat assembly has a controller in communication with the at least one actuator for controlling the at least one actuator and in communication with the sensor array. The controller is configured to control the at least one actuator to move the component along the path in response to receiving a signal indicative of a touch input by a user when a pattern of adjacent sensors in the array are activated by the user, the pattern corresponding with the path.

According to another embodiment, a vehicle seat adjustment assembly is provided with an actuator adapted to move a component of the vehicle seat assembly, and a generally planar sensor array in communication with the controller and accessible from an outer surface of the vehicle seat assembly. The sensor array has a plurality of contiguous sensors positioned on an outer surface of the vehicle seat assembly. A controller is in communication with the actuator for controlling the actuator and in communication with the sensor array. The controller is configured to control the actuator to move the component in response to receiving a signal indicative of a touch input of the sensor array by a user such that the movement of the component correlates with the input to the sensor array.

According to yet another embodiment, a vehicle seat assembly is provided with a support structure and a seat assembly component supported by the support structure that is movable relative to the support structure between a first position and a second position. An actuator is connected to the component for moving the component between the first position and the second position. A controller is in communication with the actuator for controlling the actuator. A generally planar sensor array is in communication with the controller and is positioned on an outer surface of the vehicle seat assembly. The sensor array has a first region and a second region adjoining the first region. The sensor array is configured to sense a tactile input of the first region and second region being sequentially activated by a user. The controller is configured to receive a signal indicative of the tactile input from the sensor array and command the actuator to move the component in response to the tactile input by the user.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
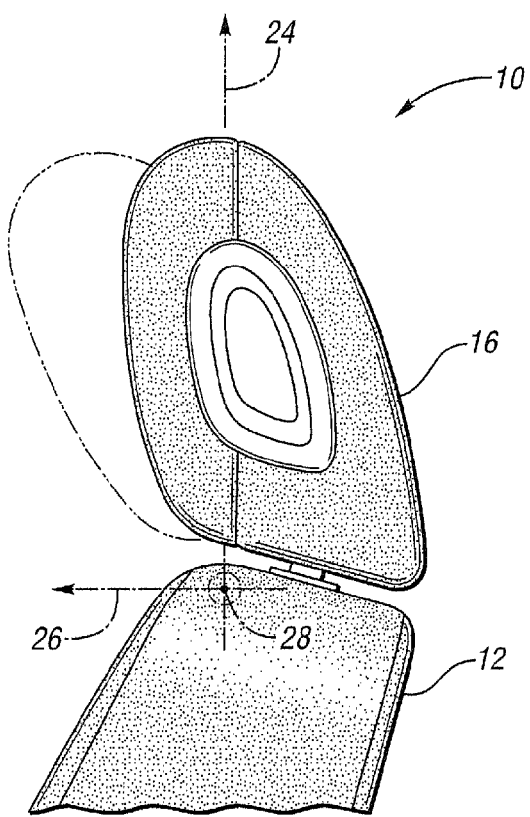
FIG. 1 is a schematic of a vehicle seat assembly according to an embodiment of the disclosure.

FIG. 1 illustrates a vehicle seat assembly 10. The vehicle seat assembly 10 may be a front seat, such as a driver seat assembly or a front passenger seat assembly, or may be a rear seat assembly, such as a second row or a third row seating of a vehicle. The seat assembly 10 has a support structure 12, such as a seatback. The support structure 12 supports a head restraint 16. The head restraint 16 has adjustment features, which allow the head restraint 16 to move in various directions to provide ergonomic support for a cross section of different users, for example, by adjusting the height, backset and tilt, and to be able to fold and stow the head restraint when not in use, to improve driver visibility or seat stowage, or the like. The head restraint 16 is shown in the design position, and in a tilted forward or folded/stowed position shown in phantom.

Figure 2:
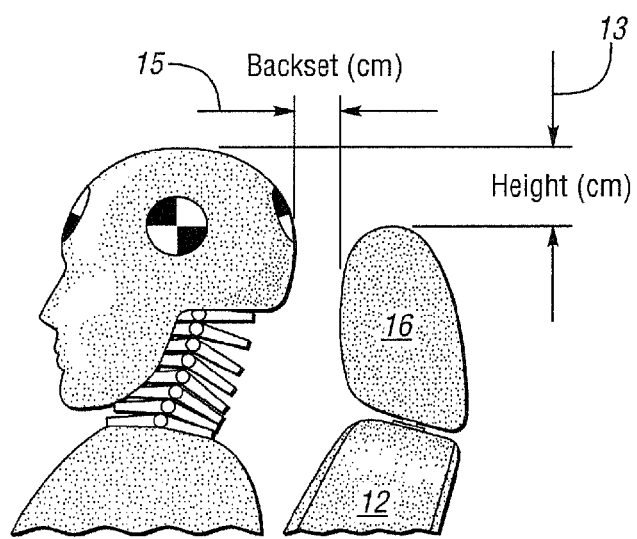
FIG. 2 is another schematic of a vehicle seat assembly.

FIG. 2 illustrates two degrees of adjustment and freedom for the head restraint 16. A height 13 of the head restraint may be adjusted as well as an amount of backset 15 of the head restraint 16.

Figure 3:
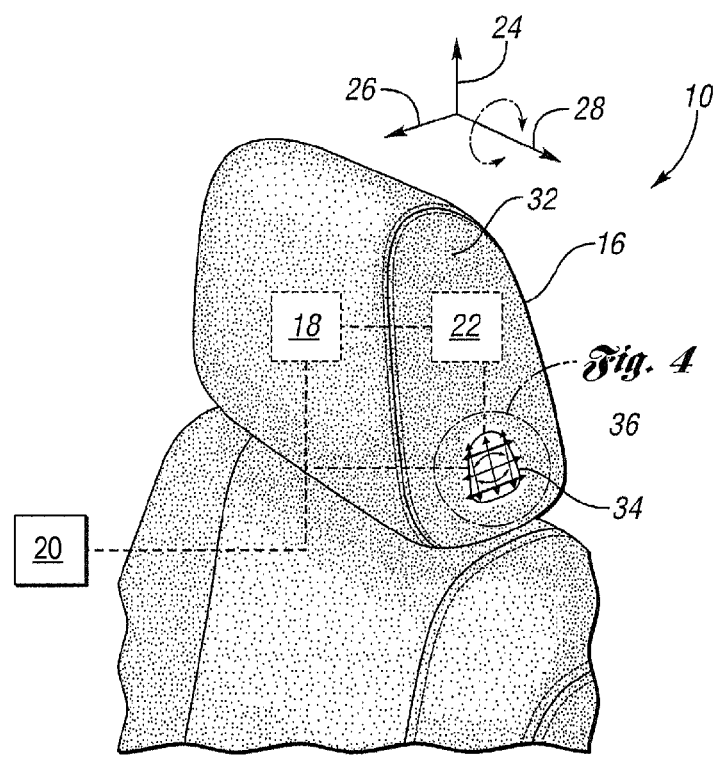
FIG. 3 is yet another schematic of a vehicle seat assembly.

The head restraint 16, as shown in FIG. 3, contains power mechanisms as are known in the art to translate or rotate the head restraint 16. For example, an actuator 18, such as an electric motor, solenoid, or the like, is connected to various rack and pinions systems, lever systems, gears, cams, cranks, linkages, etc. to provide the motion of the head restraint 16. The actuator 18 is connected to a power source 20, such as a vehicle battery or an alternator. The actuator 18 is also connected to a controller 22, such as a microcontroller or integrated circuit, or the like, which controls the actuator 18. The controller 22 may turn the actuator on and off, control the direction of motion provided by the actuator 18, and control the duration of time that the actuator 18 is operated, which may correspond to the amount of movement of the head restraint 16.

For example, the head restraint 16 is configured to move in several directions, such as along a first axis 24, along a second axis 26, and in rotation about a third axis 28. Of course, translation or rotation about any axis is contemplated, and the head restraint may move or translate about any number of axes, including a single axis or more than three axes. The first axis 24 is shown as being in an upright orientation, or aligned with the longitudinal axis of the vehicle seat assembly 10 or seatback 12. The head restraint 16 travels along this axis 24 to change the height 13 of the head restraint 16 with respect to the vehicle seat assembly 10 or to the head of an occupant of the seat 10. The second axis 26 is shown as being in line with the fore/aft direction of the head restraint 16 or the vehicle seat assembly 10, which generally corresponds with the fore/aft direction of a vehicle that the seat assembly 10 is installed in. The head restraint 16 travels along this axis 26 to adjust the amount of backset 15 of the head restraint 16 with respect to the vehicle seat assembly 10. The third axis 28 is shown as being in a lateral or transverse direction of the head restraint 16 or the vehicle seat assembly 10. The head restraint 16 rotates or pivots about this axis 28 to fold or tilt the head restraint with respect to the vehicle seat assembly 10. The head restraint 16 has an angular motion about the axis 28 to rotate between a design position and tilted or folded position as shown in FIG. 1. The head restraint 16 may be placed in the folded position when the vehicle seat assembly 10 is unoccupied. If the vehicle seat 10 is occupied or is going to be occupied, the amount of tilt of the head restraint 16 may be adjusted by rotating the head restraint 16 about axis 28 to better fit the head position of an occupant, for example, by tilting the head restraint 16 forward or rearwards within a range of thirty degrees, sixty degrees, or some other amount.

A sensor array 34 is supported by the head restraint 16 as shown, or alternatively, may be located elsewhere on the vehicle seat assembly 10, such as on the seatback 12, a vehicle door, an armrest, a console, or the like. The sensor array 34 is electrically connected to the controller 22 and is powered by the power source 20. The sensor array 34 contains a plurality of capacitive sensors 36, which may be arranged, for example, into columns and rows. Alternatively, the sensor array 34 contains a plurality of any other positional sensors as are known in the art.

Each capacitive sensor 36 operates through capacitive touch sensing, using for example, the concept of a variable capacitor. In some embodiments, a printed circuit board (PCB) based capacitor is formed and an electric field is allowed to leak into the area above the capacitor, which includes the outer surface of the sensor array 34. A user interacts with this outer layer. The sensor pad and a surrounding ground pour (or ground plane underneath) create a baseline capacitance that can be measured.

When a conductor, e.g., a finger of a user, is near to or touches the outer surface of the sensor array 34 above an open capacitor 36, the electric field is interfered with and causes the resulting capacitance to change. The sensitivity of the sensor 36 may be adjusted through the connected detector integrated circuit or controller 22 such that the outer surface of the sensor array 34 needs to be touched to activate the sensor 36. The outer surface may act as an insulating layer and to provide separation between the sensor 36 and the user. The coupling of the conductive finger with the capacitive sensor 36 increases the capacitance of the structure beyond the baseline capacitance, or the capacitance of the sensor 36 with no touch.

In some embodiments, a ground plane underneath the sensor 36 aids in shielding it from potential interference generated by other electronics and helps to maintain a more constant baseline capacitance.

Figure 4:
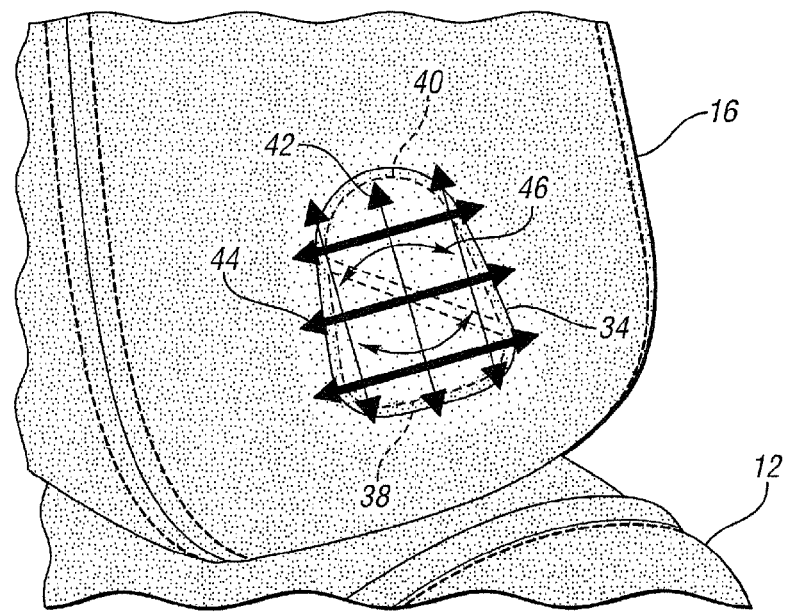
FIG. 4 is a schematic of the sensor array of FIG. 1 showing various inputs to the array according to various embodiments of the disclosure.

Referring to FIGS. 3 and 4, the head restraint 16 may be movable relative to the support structure 12 along one of the axes 24, 26, 28 between a first position and a second position. The first position and second position may be the locations of the head restraint 16 at its maximum travel along that respective axis, i.e. maximum and minimum heights, maximum and minimum backset, and design and tilted or folded positions. The actuator 18 moves the head restraint 16 along or about one or more of the axes 24, 26, 28. The sensor array 34 has a first region 38 and a second region 40. The regions 38, 40 are illustrated in FIG. 4, although any size or oriented region is contemplated. The regions 38, 40 are such that the user activates at least two sensors 36 in the array 34. The user typically slides a finger along the array 34, and activates sensors 36. If the user activates two sensors 36, the first sensor 36 activated would be in the first region 38, and the second sensor 36 activated would be in the second region 40. The path of sensors 36 activated defines the motion of the head restraint 16. The first region 38 and second region 40 may be adjacent to one another or spaced apart from one another on the sensor array 34. Each region 38, 40 contains one or more capacitive sensors 36 or other positional sensors. For example, a user interacts with the first region 38 by activating the capacitive sensors within it, and then slides their finger or otherwise activates sensors in the second region 40 immediately after interacting with the first region 38. A time limit may be programmed into the controller 22 such that the signal from sensors 36 in the second region 40 need to be received within a predetermined time after the signal from sensor 36 in the first region 38 to be considered an input. The controller 22 receives and processes the signals from the sensor array 34 and commands the actuator to move the head restraint based on the input.

For example, if the first position and second position of the head restraint are spaced apart along a longitudinal or upright axis of the vehicle seat assembly, the first and second regions of the sensor array are similarly oriented on the sensor array 34. When the user activates the first region 38 followed by the second region 40 (bottom to top motion 42 on FIG. 4), the head restraint 16 moves or translates away from the support structure 12 along the longitudinal axis 24. Based on the magnitude of the sliding motion, i.e. number of sensors 36 activated, and/or length of sensor array 34 activated, etc., the head restraint 16 may translate anywhere from an incremental amount between the first and second positions, to the complete distance between the first and second positions. Similarly, the head restraint 16 may be moved or translated from the second position to the first position by activating the second region 40 followed by the first region 38 of the sensor array 34 (top to bottom motion 42 on FIG. 4).

If the first position and second position of the head restraint 16 are spaced apart along a fore/aft axis 26 of the vehicle seat assembly 10, the first and second region of the sensor array 38, 40 are similarly oriented on the sensor array 34. When the user activates the first region 38 followed by the second region 40 (left to right motion 44 on FIG. 4), the head restraint 16 moves or translates rearward along the fore/aft axis 26. Based on the magnitude of the sliding motion, i.e. number of sensors 36 activated, and/or length of sensor array 34 activated, etc., the head restraint 16 may translate anywhere from an incremental amount between the first and second positions, to the complete distance between the first and second positions. Similarly, the head restraint 16 may be moved or translated from the second position to the first position by activating the second region 40 followed by the first region 38 of the sensor array 34 (right to left motion 44 on FIG. 4).

If the first position and second position are spaced apart about a lateral axis 28 of the vehicle seat assembly 10, such that they are at different angular positions about the axis 28, the first and second region of the sensor array 38, 40 are similarly oriented on the sensor array 34. When the user activates the first region 38 followed by the second region 40 (clockwise motion 46 on FIG. 4), the head restraint 16 moves towards a design position about the lateral axis 28. The head restraint 16 will move along an arcuate path as it is tilted by rotating about the lateral axis 28. Varying degrees of forward and backward tilt of the head restraint 16 are contemplated, including but not limited to thirty degrees, sixty degrees, to a forward folded position, or any other amount. If the head restraint 16 is capable of tilting forward or backwards through thirty degrees, the head restraint may be positioned at any position as limited by that thirty degree value, i.e. forward ten degrees, backward fifteen degrees, forward twenty degrees, etc. Based on the magnitude of the sliding motion, i.e. number of sensors 36 activated, length of sensor array 34 activated, etc., the head restraint 16 may move anywhere from an incremental amount between the first and second positions, to the complete distance between these positions. Similarly, the head restraint 16 may be moved from the second position to the first position by activating the second region 40 followed by the first region 38 of the sensor array 34 (counter clockwise motion 46 on FIG. 4).

The head restraint 16 may include a substrate (not shown) that is covered with a foam cushion or other padding material, which in turn may be covered with trim 32 such as a fabric, leather, or other similar material. In some embodiments, the sensor array 34 is connected to the substrate, and the trim cover 32 is placed over the sensor array 34 to cover it. The trim cover 32 may have demarcation such as stitching, different material, or the like, to show the location of the sensor array 34 to a user. In other embodiments, the sensor array 34 is integrated into the trim cover 32, and the trim cover 32 containing the sensor array 34 is affixed to the substrate of the head restraint 16. The sensor array 34 may be made from a flexible material to have properties similar to that of the trim cover 32.

For a head restraint 16 with a conventional adjustment system, such as a mechanical button or lever, the system is limited by design constraints, i.e. only one location for the button or lever and over a relatively small surface area of the head restraint 16 even if there is more than one location may be desired for the user interface. With embodiments of the present disclosure, the sensor array 34 may cover more than one of these preferred locations for user access to adjust the head restraint 16 because the array 34 is not as limited in size as the mechanical mechanisms, or more than one array 34 may be used at more than one location, i.e. an array 34 on the head restraint 16 and an array 34 on the support structure 12 or seatback is possible with the use of the controller 22.

In some embodiments, shown in FIGS. 3-4, the vehicle seat assembly 10 has a head restraint 16 supported by the support structure 12 where the head restraint 16 is movable relative to the support structure for translation along a first axis 24, translation along a second axis 26, and rotation about a third axis 28. Therefore the head restraint 16 has six degrees of freedom, although any number of degrees of freedom is contemplated, such as less than or more than six.

An actuator 18 is connected to the head restraint 16 to move the head restraint 16. The actuator 18 may contain more than one motor and/or more than one mechanical system to provide required motion of the head restraint 16. For example, three motors may be provided, with one for each of the translation movements, and one for the rotational movement of the head restraint 16. Also, a separate rack and pinion, lever, gear, or other mechanical mechanism may be provided for each movement.

A sensor array 34 may contain a plurality of capacitive sensors 36 or other positional sensors and is electrically connected to the controller 22. The capacitive sensors 36 are activated by the user, and the pattern or path of the activated sensors during an input determines the corresponding movement of the head restraint 16. Sample paths or patterns which correspond with movement of the head restraint 16 for translation along a first axis 24, translation along a second axis 26, and rotation about a third axis 28 are shown in FIG. 4. An input to the sensor array 36 includes the activation of at least two adjacent sensors 36, and to be considered an input by the controller 22, the adjacent sensors may need to be activated within a predetermined time limit, such that there is a maximum time delay between sensor 36 activations. When at least two adjacent sensors 36 are activated in a direction on the sensor array 34 which corresponds with one of the axes 24, 26, 28, the controller 22 commands the actuator 18 to move the head restraint 16 along that axis. As the number of adjacent sensors 36 activated for an input increases, the head restraint 16 may travel along a correspondingly longer distance along that axis.

Alternately, at the first position or the second position of the head restraint 16, at least one input from a user is required, such as the use of two fingers to activate the head restraint 16 to translate or rotate about an axis. This would activate at least two sensors 36 of the sensor array 34 in either the first or second region 38, 40, and may prevent an inadvertent activation of the head restraint 16.

Alternatively, after sensors 36 are activated in either the first or second region 38, 40 and indicate the direction of motion of the head restraint 16, if the finger remains in the same region 38, 40 and does not cross into the other region 40, 38, the motion of the head restraint 16 continues in that direction until the input from a user to the sensor array 34 ends.

The first, second, and third axes 24, 26, 28 may be nonparallel to one another, such that they converge at a point or origin. In some embodiments, the first, second, and third axes 24, 26, 28 are orthogonal to one another.

Figure 5:
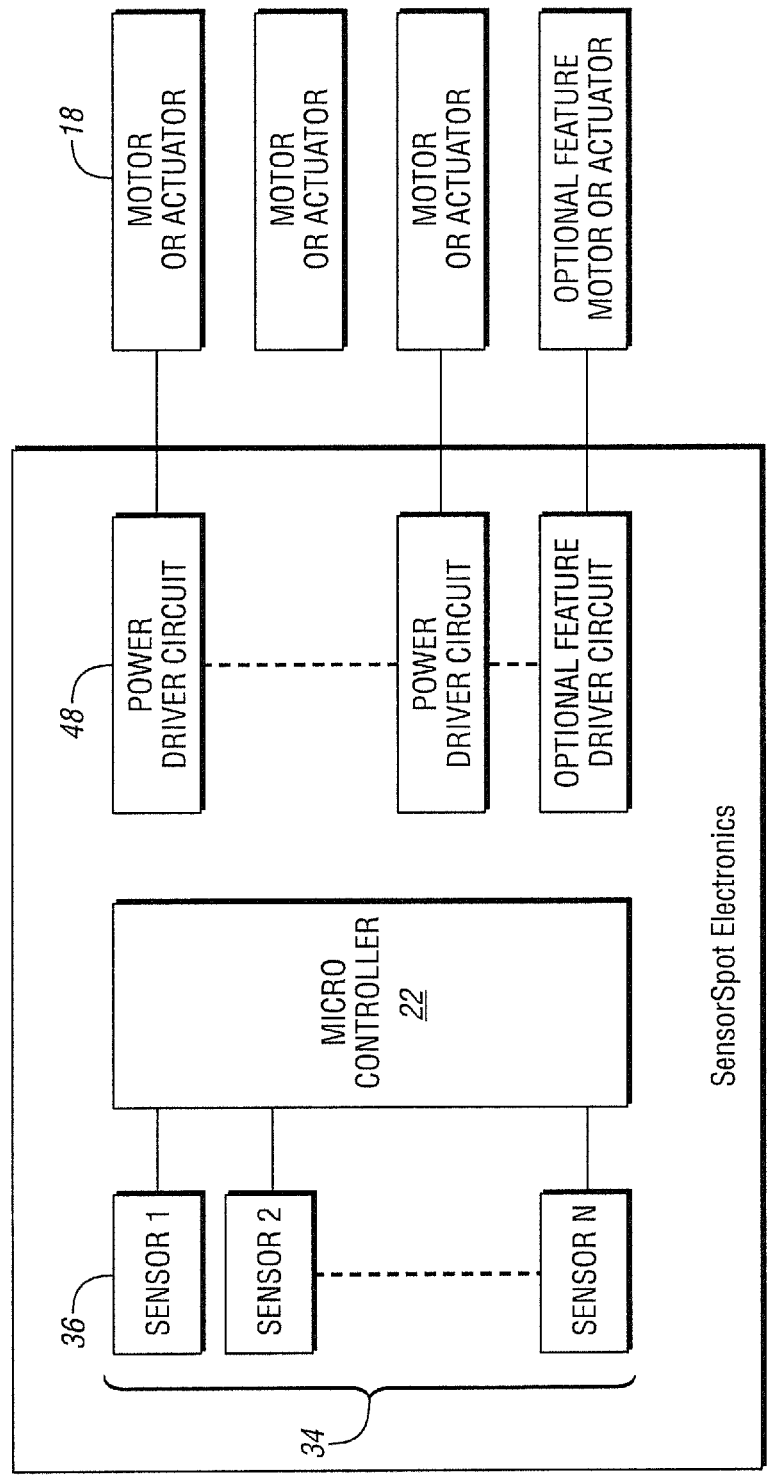
FIG. 5 is a schematic of an electronics diagram for use with the vehicle seat assembly of FIG. 3.

FIG. 5 illustrates an electrical component schematic for use with the head restraint 16. Capacitive sensors 36 in the array 34 are connected to the controller 22. A ground may also be connected to the controller 22. The controller 22 may be an integrated circuit or other microcontroller. The controller 22 is connected to the various motors or actuators 18 for the head restraint 16 using power driver circuits 48. Each actuator 18 controls one of the movements of the head restraint 16, i.e. translation along axis 24, translation along axis 26, or rotation along axis 28. Alternatively, the controller 22 may command two or more actuators 18 to act in concert to provide one of the movements, such as rotation of the head restraint 16. Optional features may be available through additional driver circuits and actuators such as movable comfort wings, head restraint monitors, anti-whiplash protection, and the like.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seat adjustment assembly comprising:
   at least one actuator adapted to move a component of a vehicle seat assembly along an arcuate path;
   a generally planar sensor array accessible from an outer surface of the vehicle seat assembly, the sensor array having a plurality of adjoining sensors forming a first region and a second region; and
   a controller in communication with the at least one actuator for controlling the at least one actuator and in communication with the sensor array, the controller configured to control the at least one actuator to move the component along the arcuate path in response to receiving a signal indicative of a first touch input by a user from the first region to the second region sequentially activating an arcuate pattern of adjacent sensors in the array.

2. The vehicle seat adjustment assembly of claim 1 wherein the at least one actuator is adapted to move the component along a linear path; and
   wherein the controller is further configured to control the at least one actuator to move the component along the linear path in response to receiving a second signal indicative of a second touch input by a user from the first region to the second region sequentially activating a linear pattern of adjacent sensors in the array.

3. The vehicle seat adjustment assembly of claim 2 wherein the first touch input intersects the second touch input; and
   wherein the linear path of the component intersects the arcuate path of the component.

4. The vehicle seat adjustment assembly of claim 2 wherein the at least one actuator is adapted to move the component along another linear path, the another linear path nonparallel with the linear path of the component; and
   wherein the controller is further configured to control the at least one actuator to move the component along the another linear path in response to receiving a third signal indicative of a third touch input by a user from the first region to the second region sequentially activating another linear pattern of adjacent sensors in the array, the second touch input nonparallel with the third touch input.

5. The vehicle seat assembly of claim 4 wherein the arcuate path of the component is about a first axis of the component, the linear path of the component is along a second axis of the component, and the another linear path of the component is along a third axis of the component; and
   wherein the first touch input is about a first axis of the sensor array corresponding to the first axis of the component, the second touch input is along a second axis of the sensor array corresponding to the second axis of the component, and the third touch input is along a third axis of the sensor array corresponding to the third axis of the component.

6. The vehicle seat adjustment assembly of claim 2 wherein the first touch input is nonparallel with the second touch input.

7. The vehicle seat adjustment assembly of claim 1 wherein the controller is configured to control the at least one actuator to move the component along the arcuate path in a first direction based on the arcuate pattern being activated from the first region to the second region; and
   wherein the controller is configured to control the at least one actuator to move the component along the arcuate path in a second direction opposite to the first direction based on a reverse of the arcuate pattern of the adjacent sensors in the array being activated by a user as another touch input from the second region to the first region.

8. The vehicle seat adjustment assembly of claim 1 wherein the controller is further configured to control the at least one actuator to move the component a longer distance along the arcuate path in response to receiving the signal indicative of the first touch input by the user when a number of adjacent sensors activated in the arcuate pattern increases.

9. The vehicle seat adjustment assembly of claim 1 wherein the controller is further configured to control the at least one actuator to move the component a longer distance along the arcuate path in response to receiving the signal indicative of the first touch input by the user when a time of activation of one of the adjacent sensors activated in the arcuate pattern increases.

10. The vehicle seat adjustment assembly of claim 9 wherein the one of the adjacent sensors activated in the arcuate pattern is a last sensor activated by the user in the arcuate pattern.

11. The vehicle seat adjustment assembly of claim 1 wherein the planar sensor array is positioned on the outer surface of the vehicle seat assembly.

12. The vehicle seat adjustment assembly of claim 1 wherein the actuator is further adapted to move the component of the vehicle seat assembly relative to a remaining portion of the vehicle seat assembly.

13. The vehicle seat adjustment assembly of claim 12 further comprising a support structure of the vehicle seat assembly, the support structure being the remaining portion of the vehicle seat assembly.

14. The vehicle seat adjustment assembly of claim 13 further comprising a head restraint, the head restraint being the component of the vehicle seat assembly.

15. A vehicle seat adjustment assembly comprising:
    at least one actuator adapted to move a component of a vehicle seat assembly along a first axis and along a second nonparallel axis;
    a generally planar sensor array accessible from an outer surface of the vehicle seat assembly, the sensor array having a plurality of contiguous sensors in a first region and a second region, the array positioned on an outer surface of the vehicle seat assembly; and
    a controller in communication with the actuator for controlling the actuator and in communication with the sensor array, the controller configured to control the actuator to move the component in response to receiving a signal indicative of a touch input of the sensor array by a user such that movement of the component correlates with the input to the sensor array, wherein the component moves along the first axis in response to a first touch input from the first region to the second region, and wherein the component moves along the second axis in response to a second touch input from the first region to the second region, the first touch input nonparallel to the second touch input.

16. The vehicle seat adjustment assembly of claim 15 wherein each sensor in the sensor array is a capacitive sensor.

17. The vehicle seat adjustment assembly of claim 15 wherein the at least one actuator is adapted to move the component about a third axis, the third axis nonparallel with the first and second axes; and wherein the component moves about the third axis in response to a third touch input from the first region to the second region, the third touch input nonparallel with the first and second touch inputs.

18. A vehicle seat assembly comprising:

a support structure;

a seat assembly component supported by the support structure and being movable relative to the support structure between a first position and a second position along a first path, and between a third position and a fourth position along a second path, the second path nonparallel with the first path;

at least one actuator connected to the component and adapted to move the component between the first position and the second position, and between the third position and the fourth position;

a controller in communication with the actuator and configured to control the at least one actuator; and a generally planar sensor array in communication with the controller and positioned on an outer surface of the vehicle seat assembly, the sensor array having a first region and a second region adjoining the first region to sense (i) a first tactile input of the first region and second region being sequentially activated by a user, and (ii) a second tactile input of the first region and second region being sequentially activated;

wherein the controller is configured to receive (i) a signal indicative of the first tactile input from the sensor array and command the at least one actuator to move the component along the first path in response to the first tactile input by the user, and (ii) a signal indicative of the second tactile input from the sensor array and command the at least one actuator to move the component along the second path in response to the second tactile input by the user.

19. The vehicle seat assembly of claim 18 wherein the controller is configured to command the actuator to move the component at least a portion of a distance between the first and second position in response to receiving the signal indicative of the first tactile input.

20. The vehicle seat assembly of claim 18 wherein the seat assembly component is movable relative to the support structure between a fifth position and a sixth position along a third path, the third path being nonparallel with the first and second paths;

wherein the at least one actuator is adapted to move the component between the fifth position and the sixth position;

wherein the sensor array senses (iii) a third tactile input of the first region and the second region being sequentially activated;

wherein the controller is configured to receive (iii) a signal indicative of the third tactile input from the sensor array and command the at least one actuator to move the component along the third path in response to the third tactile input by the user; and wherein the first tactile input, second tactile input, and third tactile input are nonparallel to one another.

* * * * *